Oct. 9, 1951  S. M. BÄCKSTRÖM  2,5670,189
HEATING MEANS, INCLUDING A HEAT TRANSFER SYSTEM
Filed Oct. 28, 1944
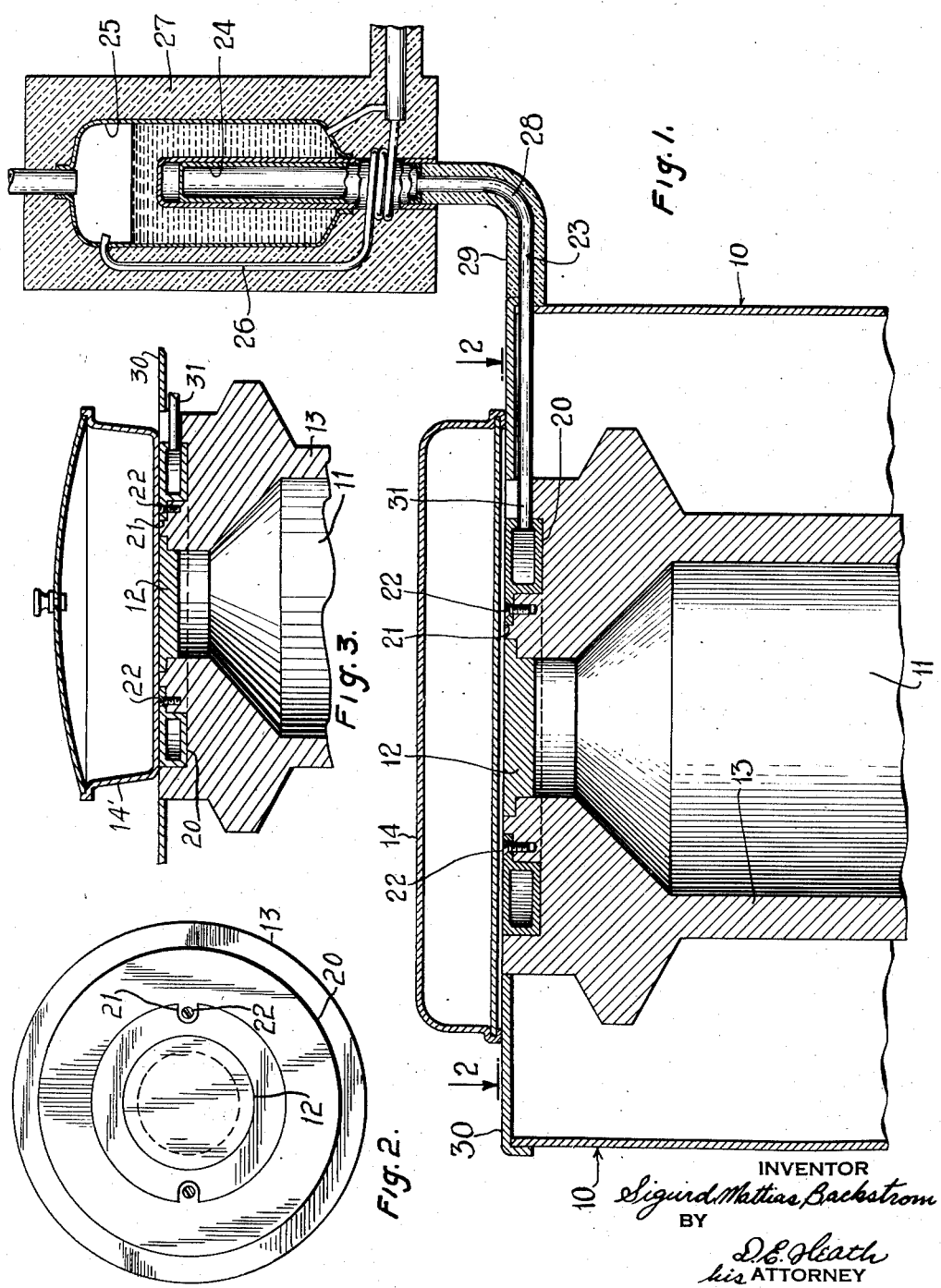
INVENTOR
Sigurd Mattias Backstrom
BY
D.E. Heath
his ATTORNEY

UNITED STATES PATENT OFFICE 2,570,189

HEATING MEANS, INCLUDING A HEAT TRANSFER SYSTEM

Sigurd Mattias Bäckström, Stockholm, Sweden, assignor to Aktiebolaget Elektrolux, Stockholm, Sweden, a corporation of Sweden Application October 28, 1944, Serial No. 560,742
In Sweden November 2, 1943

9 Claims. (Cl. 126—34)

The present invention is concerned with distribution of heat to primary and secondary objectives of heating from a primary heat source like a kitchen stove, for example. More particularly, the invention relates to continuously burning stoves of the kind in which the amount of heat produced in the fireplace is, on the one hand, by directly acting heat transfer members, such as cooking plates or similar heating elements, transferred to one or more heat consumers, cooking utensils, a baker's oven or the like, and, on the other hand, is, by an indirectly acting transfer system, supplied to a heating chamber, a heat-operated refrigerating apparatus or the like. The invention has for its object to make possible a more rational utilization of the stove and better adjust its adaptability to varying heat requirements of the different heat-consuming members of the plant.

It is already known to combine with kitchen stoves of different kinds, more particularly continuously burning stoves, certain heat-consuming household apparatus, such as heat-operated absorption refrigerating apparatus or the like, heat being transferred from the stove to these secondary heat consumers by means of a generally hermetically closed evaporating and condensing system. Especially in the case of continuously burning stoves it has proved difficult to arrange the heat-absorbing part of the heat transfer system in such a manner that, on the one hand, the mounting of the secondary heat consumer generally separated in space from the stove and, on the other hand, the removal of a considerable part of the amount of heat produced will not counteract or disturb the heat supply in the stove proper with its associated cooking plates and bakers' ovens, for example. The invention designs, on the one hand, to make possible a simple mounting of the heat-absorbing part of the heat transfer system, and, on the other hand, reduce previous inconveniences in the transfer of heat to the ordinary heat consumers of the stove. The invention is characterized chiefly in that the heat-absorbing part of the indirectly acting transfer system is arranged in heat-conducting relation with the directly acting heat transfer member of the stove.

The invention will hereinafter be more fully described with reference to the embodiment shown diagrammatically in the accompanying drawing from which also other characteristic features of the invention will be seen.

The drawing shows diagrammatically a part of a continuously burning kitchen stove and heat transfer device associated therewith, Fig. 1 being a vertical sectional view of the stove; heat transfer device; and Fig. 2 a plan view of the stove; and Fig. 3 is a fragmentary sectional view of the kitchen stove and a cooking vessel positioned thereon.

10 and 30, respectively, designate the outer sheet metal shell and top of the stove, and 11 the upper part of the fire-place, the cover 12 of which may be lifted off for filling in fuel, and which forms the central part of the cooking plate of the stove. The fire-place is arranged within a compact, thick walled container 13 made of iron or other heat-conducting material, the upper edge of said container being surface-ground and forming the peripheral parts of the cooking plate. A hinged cover 14 is arranged over said plate. This cover which, like the intermediate space between the container 13 and the outer wall 10, may suitably be provided with a layer of heat-insulating material (not shown in the drawing), has for its chief object to reduce the radiation from the cooking plate during the periods when the latter is not in use, but when a fire is still burning in the fire-place. To eliminate the risk of overheating, the stove is generally provided with a thermostat device not shown in the drawing, said device, regulating the supply of air to the fire-plate in accordance with the temperature of the cooking plate. This temperature is thus automatically kept at a constant, predetermined value.

The walls of the container 13 are, as already mentioned, thick and compact and constitute the heat-conveying members through which heat is transferred from the fire-place to the heat consumer placed on the cooking plate. According to the invention the heat-absorbing part of an evaporating and condensing system is arranged in heat-conducting relation with this heat transfer system. In the part of the cooking plate formed by the surface-ground upper edge of the container 13 there is an annular groove into which the heat-absorbing part 20 of the heat transfer system is pressed. Said part is also annular and so exactly fitted into the groove that its upper surface will be on a level with that of the cooking plate, thus ensuring a good heat-conducting contact between the cooking plate in its entirety and the generally surface-ground bottom of a cooking vessel or utensil 14' placed on said plate. The boiler part 20 of the heat transfer system may suitably be rectangular in cross section, but may quite naturally be given any other shape, in which case, however, the upward-directed surface should be plane and have substantially the same width as the width of the groove. When the ring is made of an elastic material, the groove may suitably be so formed that it widens somewhat downward. This will squeeze fast the ring pressed into the groove, said ring being kept pressed down by the upper edge of the groove. In other cases it may be necessary, as in the embodiment shown, to provide the ring with fastening members, such as ears 21, through which screws 22 are threaded into the material of the container 13. These fastening members should suitably be countersunk and, if desired, be exactly on a level with the cooking plate. The heat-absorbing part 20 of the heat transfer system communicates, in a manner shown per se, by a conduit 23 with the heat-delivering part 24 of the system, the latter part being, in the embodiment shown, introduced into the heat-absorbing part of an absorption refrigerating apparatus, such as a domestic refrigerating apparatus operating with an inert gas. Of this apparatus Fig. 1 only shows the boiler 25 with its associated thermosiphon pump 26, said apparatus parts being in known manner built into a heat insulation 27. To facilitate the mounting of the transfer system 20, 23, 24 the conduit 23 is, wholly or partly, made of a flexible material, such as a tombac tube or the like. In the example shown, such a part of the tube is designated by 28. The conduit 23 is provided with a heat-insulating layer 29 and, countersunk into the outer jacket 10 of the stove. When the upper part 30 of the outer lining of the stove can be removed, the conduit 23 may suitably be located beneath said plate, as in the embodiment shown. That part 31 of the conduit which is the nearest to the ring 20 is countersunk into a groove made for this purpose in cooking plate. It is obvious that a heat transfer system of the kind described may easily be mounted in a kitchet stove provided with grooves of a suitable shape into which the parts of the transfer system referred to may be countersunk. To adjust the position of the ring 20 there may be provided screw devices or other known devices so that the ring may be exactly adjusted with its upper edge on a level with the cooking plate. The transfer system operates, as already mentioned, with a vaporizable transfer medium, preferably mercury. Other liquids of high boiling point may, however, also be used. In certain cases it may be suitable to introduce an inert gas of a certain pressure into the system, but in other cases better results are obtained when the system only contains vapour of the transfer medium. The type and amount of transfer medium are obviously adjusted to the temperature and amount of heat with which the system is intended to work. A transfer system for transferring heat to a heating chamber may suitably contain water as transfer medium. In absorption refrigerating apparatus, more particularly a continuously operating apparatus of this kind for which substantially higher temperatures are generally required, mercury being therefore especially suitable in this case as transfer medium.

Arranging the boiler part of the transfer system in heat-conducting relation with the heat-conveying members of the stove, more particularly their parts located nearest to the heat-delivering point, offers considerable advantages.

In fact, the stove is generally so dimensioned that such parts have a substantially constant temperature. In other cases the stove is provided with a thermostatic plant which automatically keeps the temperature of the cooking plates or the different ovens of the stove at a constant value. It is obvious that the arrangement according to the invention will utilize this advantage, thus saving those adjusting members which are generally required, when an absorption refrigerating apparatus is to be operated by means of an evaporating and condensing system. Especially continuously burning kitchen stoves are, however, generally so dimensioned and constructed that the whole of the maximum heat amount generated in the fire-place may, with extremely low losses, be transferred to the cooking plates and the ovens, if any, in the stove. Under such conditions the application of a secondarily operated domestic apparatus, the heat consumption of which is generally considerable, has, of course, a disturbing influence on the efficiency of the stove, the flow of heat to its primary heat consumers being reduced, without it being possible to compensate for the reduction by an increased firing in the stove. The arrangement according to the invention has not, however, these drawbacks. The boiler part 20 of the transfer system is so arranged that it can deliver heat to cooking utensils placed on the cooking plate and effect an automatic adjustment of the flow of heat transferred from the stove to the secondarily operated apparatus relative to the actual heat consumption of the cooking plates or the ovens, respectively. If, in fact, a cooking utensil, the temperature of which is lower than the temperature of the transfer system, more particularly its heat-delivering part, is placed on the cooking plate, there will ensue a condensation in the ring 20, the flow of heat through the conduit 23 decreasing or even stopping. Only when the cooking utensil has reached the intended higher temperature or has been removed from the cooking plate, will there again ensue a continued transfer of heat to the boiler 25. During the periods when the cooking-plate is not used the heat supply is obviously always sufficient for the operation of the refrigerating apparatus. The secondarily operated heat-consuming apparatus will not thus have any disturbing effect on the operation of the stove, because heat is only supplied to them, according as the load on the primary heat consumer of the stove allows of a heat transfer to the secondary apparatus arranged outside the stove.

In view of the foregoing, it will now be understood than an improved arrangement has been provided for controlling and regulating the manner in which use is made of heat available at the top of the stove 10 which serves as a cooking plate and may be referred to as a heat-delivery member. The cooking vessel 14', which may be referred to as the primary objective of heating, directly receives heat from the top surface of the heat-delivery member formed by the uppermost part of the stove wall 13, such member being heated by the fire maintained in the chamber 11.

The heat receiving part of the heat-operated refrigeration apparatus, which constitutes the secondary objective of heating, is heated by an indirect heat transfer system having a heat-absorbing member 20 in heat-conductive relation with the delivery member, such heat-absorbing member having a top wall in heat-conductive contact with the vessel 14' when the latter is positioned to receive heat from the heat-delivery surface. The indirect heat transfer system is of a hermetically closed type in which the heat-absorbing part 20 constitutes a vaporization portion and the heat-delivering member 24 at a higher level constitutes a condenser in thermal relation with the secondary objective of heating. The heat transfer system is partly filled with the volatile heat transfer fluid, as previously explained, which is outside the condenser 24 when the system is not functioning to transfer heat and such fluid is substantially completely in a liquid state. When the primary objective of heating, such as the vessel 14', for example, is positioned on the heat-delivery member to receive heat therefrom, the vessel 14' can also receive heat from the top wall of the vaporization portion 20 to augment the heat received from the surface of the heat-delivery member to heat the vessel 14' to a desired temperature before simultaneous vaporization of heat transfer fluid in the vaporization portion 20 and condensation of such vaporized fluid in condenser 24 occurs to transfer heat to the refrigeration apparatus and effect heating of the latter.

Accordingly, when the cooking vessel 14' and its contents are placed on the stove in the manner shown in Fig. 3, the portion 20 of annular shape forms a part of the heat-conductive path from the heat source in chamber 11 to the heat-delivery member upon which the vessel 14' is positioned. Further, heat of liquid of the body of heat transfer fluid in the annular portion 20 is given up to the vessel and matter being heated therein. Under these conditions, heat of vaporization is not supplied to the body of heat transfer fluid in the heat-absorbing portion 20 until the vessel 14' to be heated reaches a desired elevated temperature. In the hermetically closed heat system shown and described above, heat transfer to the secondary objective of heating does not occur until there is simultaneous vaporization of heat transfer fluid in the vaporization portion 20 and condensation of such vaporized fluid in the condenser 24.

The invention may be varied in several ways, without departing from the spirit of the invention. Thus, the heat-absorbing part of the heat transfer system may be arranged in heat-conducting relation with other parts of the heat transfer members of the stove than the cooking plate and especially with those parts in which the flow of heat is changed by variable load on the cooking plates or ovens. For enabling a simple mounting of the transfer system grooves are made in the heat-conveying members of the stove, which grooves may be provided with blind fillings in those cases where the transfer system is removed. In the arrangement according to Fig. 1 a compact ring is thus suitably pressed into the annular groove, when the heat transfer system is removed, said ring having exactly the same dimensions and the same shape as the heat-absorbing part 20. As a result, the heat transfer surface from the cooking plate to the cooking utensils placed thereon will not be changed, though the transfer system has been removed.

I claim:

1. Apparatus for heating primary and secondary objectives of heating comprising means providing a heat delivery member having a surface from which a primary objective of heating, such as a cooking vessel, for example, directly receives heat, means to effect heating of said member, means for indirectly heating a secondary objective of heating comprising an hermetically closed vaporization-condensation heat transfer system including a vaporization portion at one level in heat conductive relation with said heat delivery member and a condenser at a higher level in thermal relation with the secondary objective of heating, said hermetically closed system being partly filled with a volatile heat transfer fluid which is outside said condenser when said system is not functioning to transfer heat and such fluid is substantially completely in a liquid state, said vaporization portion having a wall from which the primary objective can receive heat, when such primary objective is positioned to receive heat from said surface, to augment the heat received from said surface to heat the primary objective to a desired temperature before simultaneous vaporization of heat transfer fluid in said vaporization portion and condensation of such vaporized fluid in said condenser occurs to transfer heat to the secondary objective of heating and effect heating of the latter.

2. Apparatus as set forth in claim 1 comprising a kitchen stove having a top including said heat delivery member, and said means to heat said member includes structure providing a heating chamber in which a source of heat is adapted to be maintained.

3. Apparatus as set forth in claim 1 comprising a kitchen stove of the continuous burning type having a top including said heat delivery member, and said means to heat said member comprises structure providing a fire box in which the source of heat is adapted to be maintained.

4. Apparatus as set forth in claim 1 in which said heat delivery member is recessed at the top surface thereof at the region at which the primary objective of heating, such as a cooking vessel, for example, is adapted to be positioned, said vaporization portion being disposed in such recess so that the wall member thereof is substantially flush with the top surface of said heat delivery member.

5. Apparatus for heating primary and secondary objectives of heating comprising means providing a heat delivery member having a surface from which a primary objective of heating directly receives heat, means to effect heating of said member, means for heating a secondary objective of heating comprising an indirect heat transfer system including a heat absorbing member in heat conductive relation with said heat delivery member, said heat absorbing member having a wall in heat conductive contact with the primary objective of heating when the latter is positioned to receive heat from said heat delivery surface, and means including said heat absorbing member to augment the heat received by the primary objective from said heat delivery surface to heat the primary objective to a desired temperature before said indirect heat transfer system becomes operable to effect heating of the secondary objective of heating.

6. Apparatus as set forth in claim 5 in which said heat delivery member is formed with a recess at the top surface thereof at the region at which the primary objective of heating is adapted to be positioned, said heat absorbing member being disposed in such recess so that said wall member is substantially flush with the top surface of said heat delivery member.

7. Apparatus for heating primary and secondary objectives of heating comprising means providing a heat delivery member having a surface from which a primary objective of heating, such as a cooking vessel, for example, directly receives heat, means to effect heating of said member, means for indirectly heating a secondary objective of heating comprising an hermetically closed vaporization-condensation heat transfer system including a vaporization portion at one level in heat conductive relation with said heat delivery member and a condenser at a higher level in thermal relation with the secondary objective of heating, said hermetically closed system being partly filled with a volatile heat transfer fluid which is outside said condenser when said system is not functioning to transfer heat and such fluid is substantially completely in a liquid state, said vaporization portion being annular in form and having a wall from which the primary objective can receive heat, when such primary objective is positioned to receive heat from said surface, to augment the heat received from said surface to heat the primary objective to a desired temperature before simultaneous vaporization of heat transfer fluid in said vaporization portion and condensation of such vaporized fluid in said condenser occurs to transfer heat to the secondary objective of heating and effect heating of the latter.

8. Apparatus for heating primary and secondary objectives of heating comprising means providing a heat delivery member having a surface from which a primary objective of heating, such as a cooking vessel, for example, directly receives heat, said heat delivery member being formed with an opening and removable closure means therefor, means to effect heating of said member, means for indirectly heating a secondary objective of heating comprising an hermetically closed vaporization-condensation heat transfer system including a vaporization portion at one level in heat conductive relation with said heat delivery member and a condenser at a higher level in thermal relation with the secondary objective of heating, said hermetically closed system being partly filled with a volatile heat transfer fluid which is outside said condenser when said system is not functioning to transfer heat and such fluid is substantially completely in a liquid state, said vaporization portion being annular in form and disposed about the opening and having a wall from which the primary objective can receive heat, when such primary objective is positioned to receive heat from said surface, to augment the heat received from said surface to heat the primary objective to a desired temperature before simultaneous vaporization of heat transfer fluid in said vaporization portion and condensation of such vaporized fluid in said condenser occurs to transfer heat to the secondary objective of heating and effect heating of the latter.

9. Apparatus as set forth in claim 7 in which the top surface of said heat delivery member is recessed, said vaporization portion being disposed in said recess so that the wall member thereof is substantially flush with the top surface of said heat delivery member.

SIGURD MATTIAS BÄCKSTRÖM.

REFERENCES CITED

The following references are of record in the file of this patent:

UNITED STATES PATENTS

| Number | Name | Date |
|---|---|---|
| 15,156 | Whiteley | June 17, 1856 |
| 123,842 | Ryder | Feb. 20, 1872 |
| 449,918 | Roberts | Apr. 7, 1891 |
| 928,261 | Knapp | July 20, 1909 |
| 1,101,243 | Bell | June 23, 1914 |
| 2,095,052 | Brown | Oct. 5, 1937 |

FOREIGN PATENTS

| Number | Country | Date |
|---|---|---|
| 118,930 | Switzerland | Feb. 1, 1927 |
| 132,172 | Germany | July 7, 1902 |
| 134,036 | Great Britain | Oct. 27, 1919 |